(12) United States Patent
Liang

(10) Patent No.: US 8,470,466 B2
(45) Date of Patent: Jun. 25, 2013

(54) BATTERY COVER LATCHING MECHANISM AND PORTABLE ELECTRONIC DEVICE USING SAME

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 410 days.

(21) Appl. No.: 12/888,524

(22) Filed: Sep. 23, 2010

(65) Prior Publication Data

US 2011/0244311 A1    Oct. 6, 2011

(30) Foreign Application Priority Data

Mar. 30, 2010   (CN) .............................. 201010136127

(51) Int. Cl.
*H01M 2/10* (2006.01)
(52) U.S. Cl.
USPC ........................................................ 429/97

(58) Field of Classification Search
None
See application file for complete search history.

(56) References Cited

U.S. PATENT DOCUMENTS

2010/0092847 A1* 4/2010 Li ................................... 429/97

* cited by examiner

*Primary Examiner* — Jonathan Crepeau
(74) *Attorney, Agent, or Firm* — Altis Law Group, Inc.

(57) ABSTRACT

A battery cover latching mechanism and a portable electronic device using the same are provided. The battery cover latching mechanism detachably locks a battery cover to the housing and includes an assembly portion, a locking assembly and a lock portion. The locking assembly is mounted to the assembly portion of the housing and includes an elastic piece and a latching member. The elastic piece is assembled within the receiving slot. The latching member is elastically and releasably assembled within the receiving slot by the elastic piece for locking or releasing the battery cover. The locking portion is formed on the battery cover and locked by the latching member.

17 Claims, 6 Drawing Sheets

BATTERY COVER LATCHING MECHANISM AND PORTABLE ELECTRONIC DEVICE USING SAME

BACKGROUND

1. Technical Field

The present disclosure relates to cover latching mechanisms and particularly, to a battery cover latching mechanism used in a portable electronic device.

2. Description of Related Art

Portable electronic devices often include latches for securing battery covers. The batteries must be able to be removed and installed multiple times. Therefore, the latches on the covers must be able to endure these multiple processes.

A typical cover latch mechanism includes at least one spring to facilitate its operation. However, the latching of the cover and a housing of the electronic device is often too firm to be easily released.

Therefore, there is room for improvement within the art.

BRIEF DESCRIPTION OF THE DRAWINGS

Many aspects of the present disclosure can be better understood with reference to the following drawings. These drawings are not necessarily drawn to scale, the emphasis instead being placed upon clearly illustrating the principles of the present battery cover latching mechanism and portable electronic device using the same. Moreover, in the drawings like reference numerals designate corresponding sections throughout the several views.

DETAILED DESCRIPTION

In this exemplary embodiment, the battery cover latching mechanism is applied to a mobile telephone. The mobile telephone described herein is a representation of one type of portable electronic device that may benefit from the exemplary embodiment. However, it is to be understood that the exemplary embodiment may be applied to any type of handheld or portable electronic device including, but not limited to, the following devices: radiotelephones, cordless phones, paging devices, personal digital assistants, portable computers, portable media players (such as an MP3 or DVD player) and the like. Accordingly, any reference herein to the mobile telephone should also be considered to apply equally to other portable wireless electronic devices.

Figure 1:
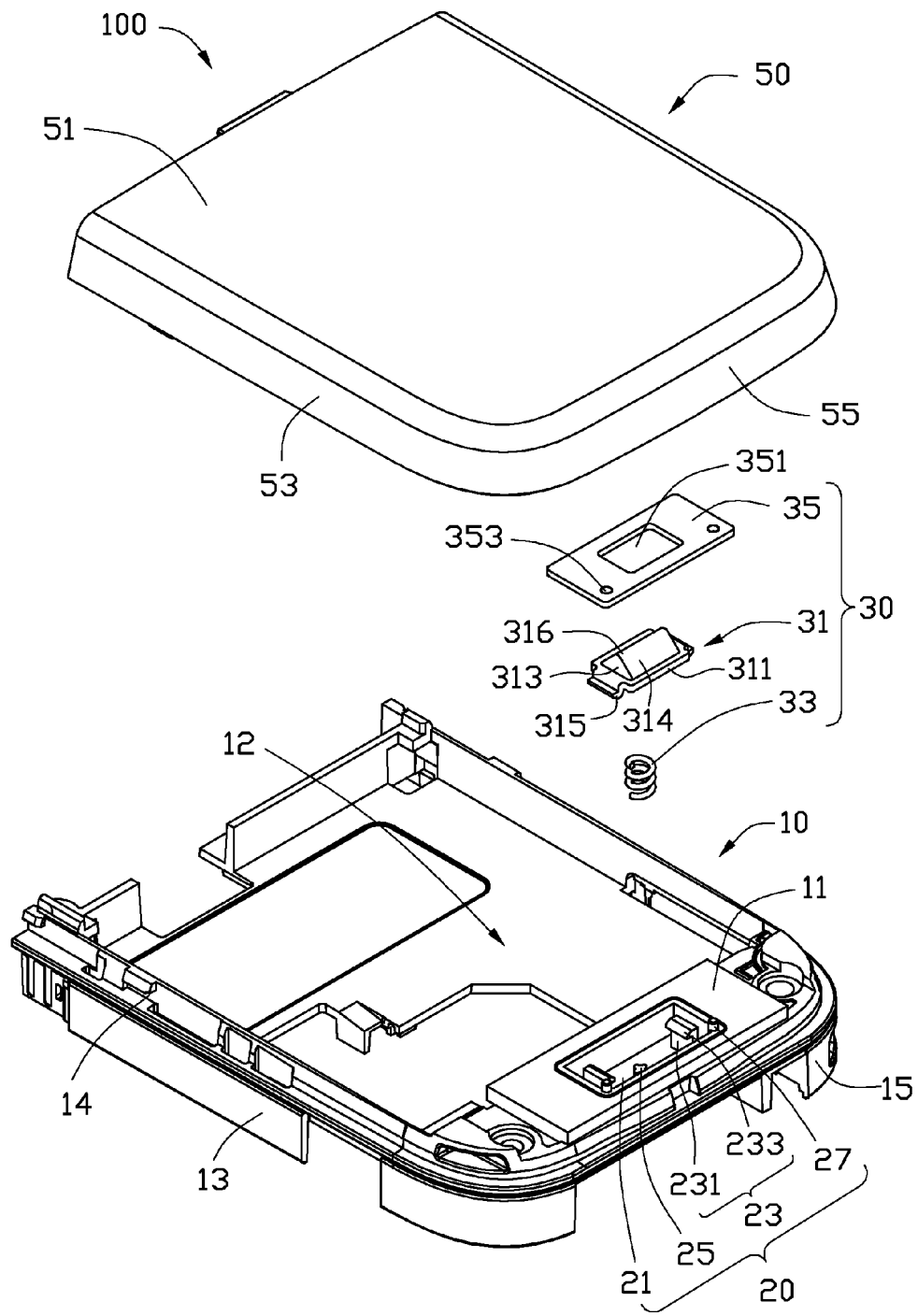
FIG. 1 shows an exploded, isometric view of a portable electronic device employing a battery cover latching mechanism, in accordance with an exemplary embodiment.
Figure 2:
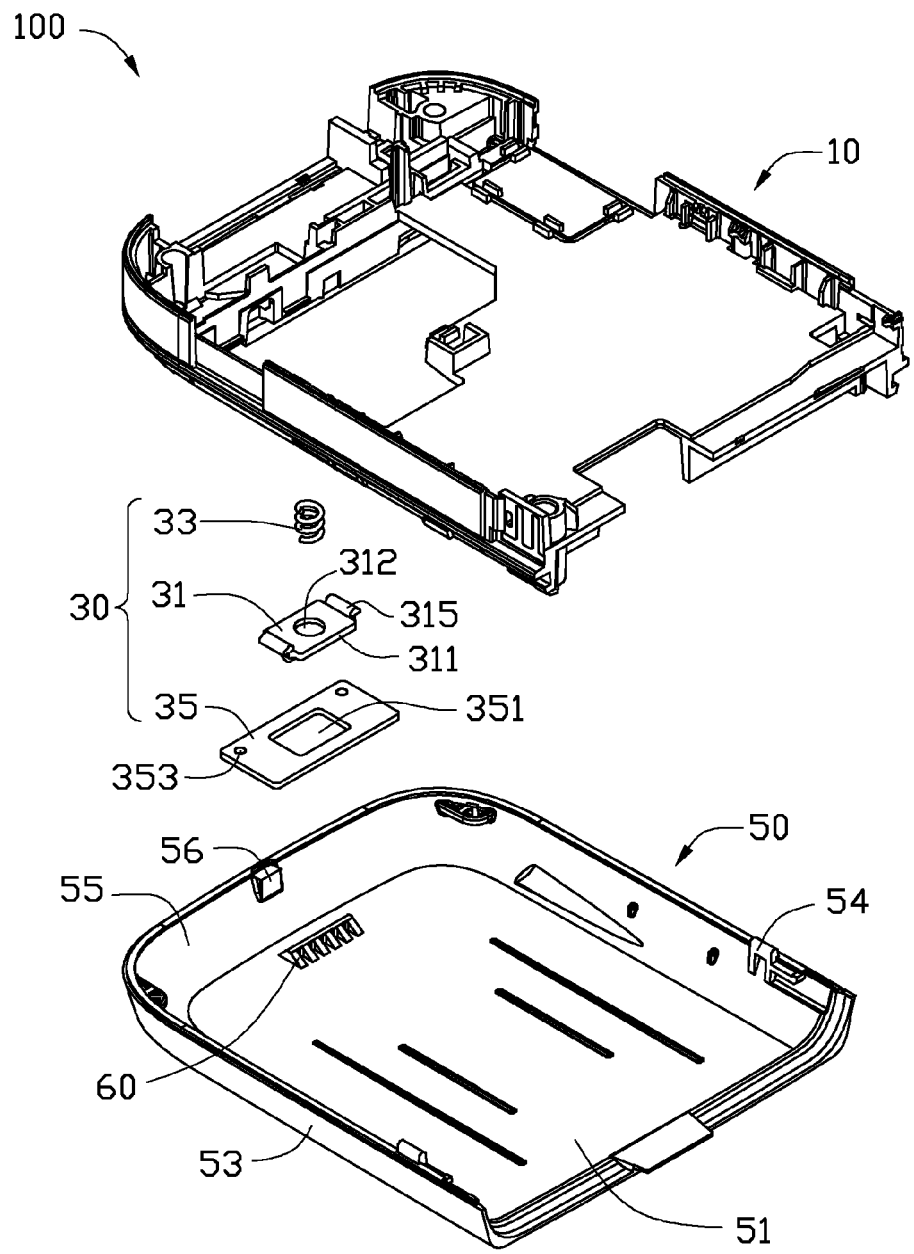
FIG. 2 is similar to FIG. 1, but viewed from another aspect.

FIGS. 1 and 2 show a portable electronic device 100 employing a battery cover latching mechanism (not labeled) including a housing 10, a locking assembly 30, and a battery cover 50. The locking assembly 30 is mounted to the housing 10 and detachably latches the battery cover 50 to the housing 10. The battery cover latching mechanism includes an assembly portion 20 defined in the housing 10, the aforementioned locking assembly 30 and a locking portion 60 formed on the battery cover 50.

The housing 10 includes a base board 11, an end wall 15, and two opposite sidewalls 13 substantially perpendicularly connected to opposite ends of the end wall 15. The base board 11 includes a substantially rectangular battery accommodating cavity 12 recessed for receiving a battery (not shown). Each sidewall 13 defines at least one latching slot 14 opposite to each other. A latching groove 16 is recessed in the substantially middle portion of the end wall 15 (shown in FIG. 3). The assembly portion 20 is formed on the base board 11 substantially adjacent to the end wall 15 and is spaced from the battery accommodating cavity 12 for assembling the locking assembly 30 to the housing 10. The assembly portion 20 includes a receiving slot 21, two latching hooks 23, a post 25, and two fixable pins 27. The receiving slot 21 is a substantially rectangular cavity recessed in the base board 11 near and substantially parallel to the end wall 15. The two latching hooks 23 protrude from the bottom surface of the receiving slot 21 and are positioned substantially adjacent to opposite ends of the receiving slot 21. Each latching hook 23 is received within the receiving slot 21 and include a guide arm 231 and a hook portion 233. The guide arm 231 projects substantially perpendicularly from the bottom surface of the receiving slot 21. The hook portion 233 is formed at the distal end of the guide arm 231. The post 25 protrudes from the substantially middle portion of the bottom surface of the receiving slot 21 and is located between the two latching hooks 23. The two fixable pins 27 are formed on the base board 11 substantially adjacent to the periphery of the receiving slot 21.

The locking assembly 30 includes a latching member 31, an elastic piece 33 and a fixing board 35. The latching member 31 is elastically assembled to be released within the receiving slot 21 of the housing 10 for locking or releasing of the battery cover 50. The latching member 31 includes a base board 311, a locking block 313 and two latching blocks 315. The base board 311 is substantially rectangular and defines a mounting hole 312 therethrough. The locking block 313 is substantially triangular prism-shaped, protruding from one surface of the base board 311, being located above the mounting hole 312. The locking block 313 includes two resisting slopes 314 and a peak portion 316 connected between the two resisting slopes 314. The two latching blocks 315 are formed at opposite ends of the base board 311 away from each other and latch with the corresponding two latching hooks 23, thereby assembling the latching member 31 within the receiving slot 21 of the assembly portion 20 of the housing 10.

The elastic piece 33 is a coil spring in the present embodiment, and is assembled within the receiving slot 21 by coiling itself around the post 25. The elastic piece 33 provides an elastic rebound force when the key button latching member 31 is pressed, to return to its original position. The fixing board 35 is fixed to the base board 10 and covers the corresponding receiving slot 21. A substantially rectangular assembly hole 351 is defined through the substantially middle portion of the fixing board 35 corresponding to the locking block 313. The assembly hole 351 exposes the locking block 313 out of the receiving slot 21. Two fixing holes 353 are defined through the fixing board 35 and are located substantially adjacent to the periphery of the fixing board 35 respectively corresponding to the two fixable pins 27.

The battery cover 50 can be detachably mounted to the housing 10 by the locking assembly 30. The battery cover 50 includes a cover body 51, two lateral walls 53 extending from two opposite sides of the cover body 51, and an end wall 55 extending from one distal end of the cover body 51. Each lateral wall 53 includes at least one latching block 54 corresponding to the at least one latching slot 14. A fixed block 56 protrudes from an inner surface of the end wall 55 and is positioned at the substantially the middle portion of the end wall 55 corresponding to the latching groove 16 of the housing 10.

The locking portion 60 protrudes from the inner surface of the cover body 51 and is positioned adjacent to the end wall 55 corresponding to the locking block 313.

Figure 3:
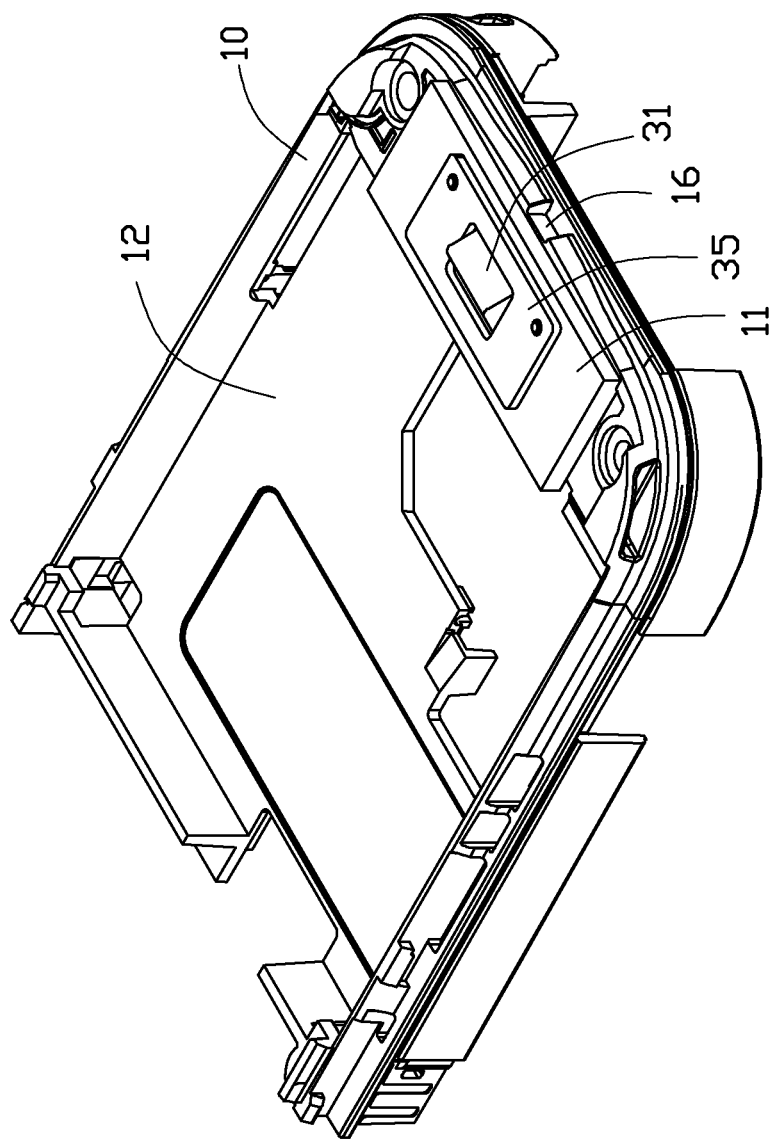
FIG. 3 is a partially assembled perspective view of the portable electronic device, wherein, the battery cover is detached therefrom.

Referring further to FIG. 3, in assembly, the elastic piece 33 is assembled into the receiving slot 21 and coils around the post 25; the latching member 31 is mounted to the receiving slot 21, aligning the mounting hole 312 with the post 25. The distal end of the post 25 and the distal end of the elastic piece 33 pass into and are received within the mounting hole 312 of the latching member 31. The two latching blocks 315 of the latching member 31 latch to the corresponding hook portions 233 and resist against the corresponding guide arm 231. When the latching member 31 is pressed downwardly with an external force, the two latching blocks 315 slide relative to the corresponding two guide arms 231. After that, the fixing board 35 is placed on the housing 10 and covers the receiving slot 21. The two fixable pins 27 pass through the corresponding two fixing holes 353 and are fixed with the fixing board 35. The locking block 313 passes through and is exposed out of the assembly hole 351 of the fixing board 35.

Figure 4:
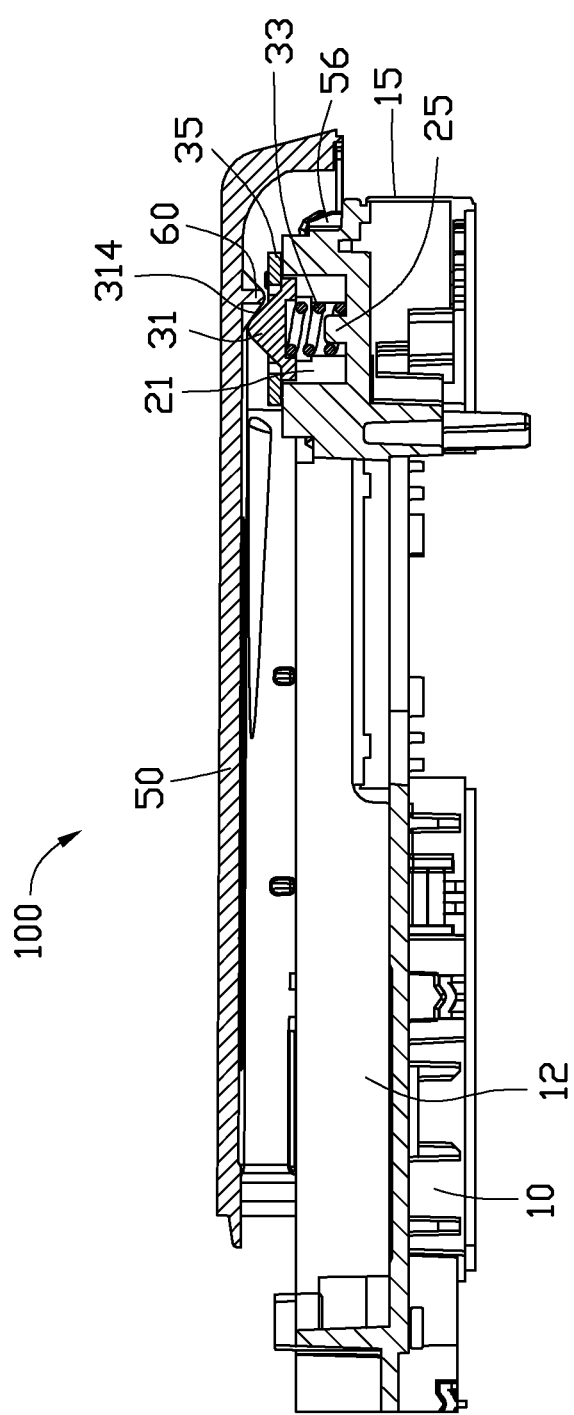
FIGS. 4-6 are three cross-sectional views of an assembled perspective view of the portable electronic device of FIG. 1, respectively showing three different assembling states of the portable electronic device.
Figure 5:
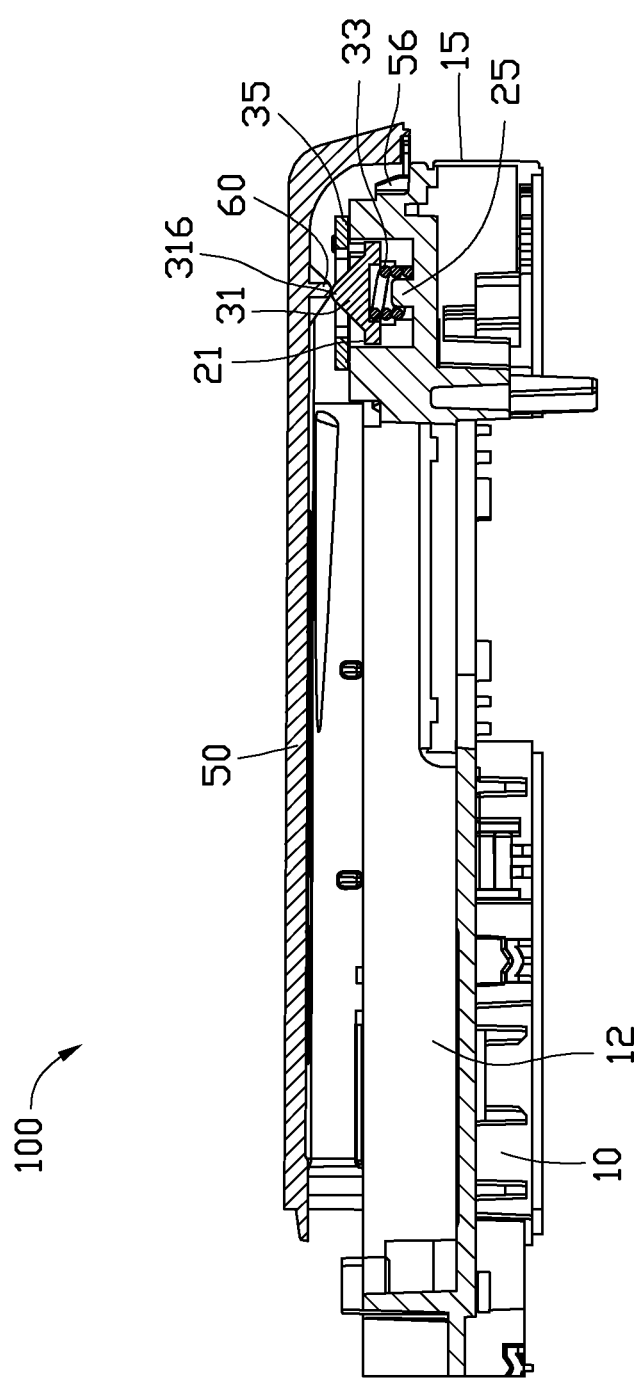
Figure 6:
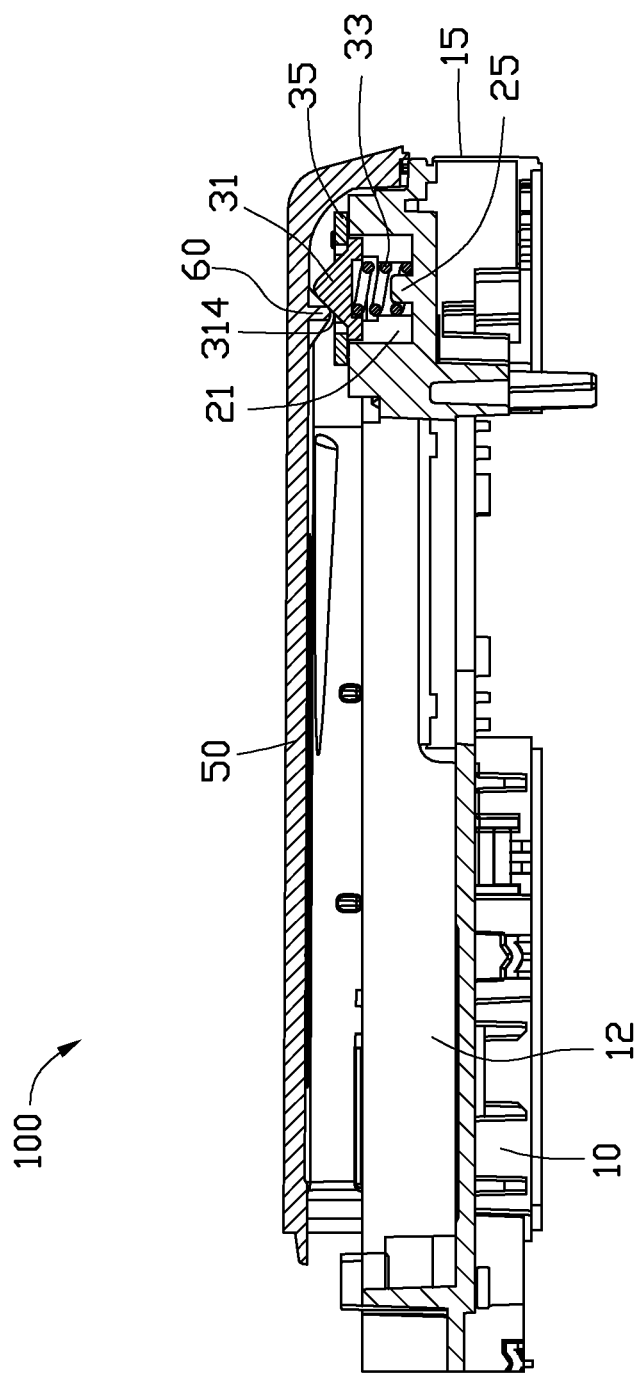

Referring to FIGS. 4-6, when assembling the battery cover 50 to the housing 10, the two lateral walls 53 abut against the corresponding two sidewalls 13 of the housing 10, the locking portion 60 resists on one slope 314 of the latching member 31 that opposes the end wall 15 (shown in FIG. 4). After that, the battery cover 60 is pushed toward the battery accommodating cavity 12. Meanwhile, the latching member 31 is pushed and is resisted against by the locking portion 60 of the battery cover 50. Thus, pressing the elastic piece 33 slides the latching member 31 towards the bottom surface of the receiving slot 21 along the guide arm 231, until the locking portion 60 arrives at the peak portion 316 of the latching member 31 (shown in FIG. 5). By continuing to push the battery cover 50 toward the battery accommodating cavity 12, the locking portion 60 overlies the peak portion 316 and slides relative to the other slope 314 substantially adjacent to the side of the battery accommodating cavity 12. The elastic piece 33 is released to push the latching member 31 to return to its original position. The latching blocks 54 and the fixed block 56 latch into the corresponding latching slots 14 and latching groove 16 of the housing 10. The locking portion 60 tightly resists against the slope 314 of the latching member 31. Thus, the battery cover 50 is tightly assembled to the housing 10.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching mechanism comprising:
    an assembly portion comprising two latching hooks, a post, and a receiving slot defined in a housing, the two latching hooks protruding from the bottom of the receiving slot opposite to each other and positioned adjacent to two ends of the receiving slot, the post protruding from the bottom of the receiving slot and located between the two latching hooks;
    a locking assembly mounted to the assembly portion of the housing and for detachably locking a battery cover to the housing; the locking assembly comprising:
        an elastic piece assembled within the receiving slot; and
        a latching member elastically and releasably assembled within the receiving slot by the elastic piece for locking or releasing the battery cover, the latching member comprising two latching blocks for latching with the corresponding two latching hooks; and
        a locking portion formed on the battery cover and to be locked by the latching member;
        wherein the elastic piece comprises a coil spring coiled around the post and elastically sandwiched between the latching member and the bottom of the receiving slot.

2. The battery cover latching mechanism as claimed in claim 1, wherein each latching hook is received within the receiving slot and comprises a guide arm perpendicularly projecting from the bottom of the receiving slot and a hook portion formed at the distal end of the guide arm.

3. The battery cover latching mechanism as claimed in claim 1, wherein the locking assembly further comprises a fixing board fixed to the housing and covering the corresponding receiving slot; the fixing board defines an assembly hole; the latching member comprising a base board and a locking block protruding from one surface of the base board, the two latching blocks are formed at opposite ends of the base board; the locking block exposed from the assembly hole.

4. The battery cover latching mechanism as claimed in claim 3, wherein the locking block is substantially triangular prism-shaped and comprises two resisting slopes inclined to two sides of the base board and a peak portion formed at the joint of the two resisting slopes away from the base board.

5. A portable electronic device, comprising:
    a housing having an assembly portion and comprising a receiving slot and at least one latching slot recessed in the housing;
    a battery cover having at least one latching block formed thereon corresponding to the at least one latching slot and a locking portion formed on the battery cover; and
    a locking assembly assembled to the housing and for detachably locking the battery cover to the housing; the locking assembly comprising:
        an elastic piece assembled within the receiving slot; and
        a latching member elastically and releasably assembled within the receiving slot by the elastic piece, and resisting against the corresponding locking portion of the battery cover for locking or releasing the battery cover;
        wherein the assembly portion comprises a post protruding from the bottom of the receiving slot, the elastic piece comprises a coil spring coiled around the post and elastically sandwiched between the latching member and the bottom of the receiving slot.

6. The battery cover latching mechanism as claimed in claim 5, wherein the housing comprises a base board, an end wall, and two opposite sidewalls connected to opposite ends of the end wall; the at least one latching slot recessed in the sidewall; the receiving slot recessed in the base board; the battery cover including a cover body, two lateral walls and an end wall, the at least one latching block formed on the corresponding lateral wall, thereby latching the battery cover to the housing.

7. The battery cover latching mechanism as claimed in claim 6, wherein the assembly portion further includes two latching hooks protruding from the bottom of the receiving slot opposite to each other and positioned adjacent to two ends of the receiving slot; the latching member includes two latching blocks to latch with the corresponding two latching hooks.

8. The battery cover latching mechanism as claimed in claim 7, wherein each latching hook is received within the receiving slot and includes a guide arm perpendicularly projecting from the bottom of the receiving slot and a hook portion formed at the distal end of the guide arm.

9. The battery cover latching mechanism as claimed in claim 8, wherein the post is located between the two latching hooks.

10. The battery cover latching mechanism as claimed in claim 9, wherein the locking assembly further comprises a fixing board fixed to the housing and covering the corresponding receiving slot; the fixing board defining an assembly hole; the latching member including a locking block protruding from one surface of the base board, the two latching blocks formed at opposite ends of the base board; the locking block exposed from the assembly hole.

11. The battery cover latching mechanism as claimed in claim 10, wherein the locking block is triangular prism-shaped and comprises two resisting slopes inclined to two sides of the base board and a peak portion is formed at the joint of the two resisting slopes.

12. The battery cover latching mechanism as claimed in claim 8, wherein the battery cover further comprises a fixed block protruding from an inner surface of the end wall of the battery cover, the housing further comprises a latching groove recessed in the end wall of the housing corresponding to the fixed block.

13. A battery cover latching mechanism comprising:
an assembly portion comprising a receiving slot defined in a housing;
a locking assembly mounted to the assembly portion of the housing and for detachably locking a battery cover to the housing; the locking assembly comprising:
 an elastic piece assembled within the receiving slot; and
 a latching member elastically and releasably assembled within the receiving slot by the elastic piece for locking or releasing the battery cover, the latching member comprising a base board and a locking block protruding from one surface of the base board; and
a locking portion formed on the battery cover and to be locked by the latching member;
wherein the elastic piece is elastically sandwiched between the latching member and the bottom of the receiving slot; the locking block is substantially tri-angular prism-shaped and comprises two resisting slopes inclined to two sides of the base board and a peak portion formed at the joint of the two resisting slopes away from the base board; when one of the resisting slopes is pushed and is resisted against by the locking portion, the elastic piece slides the latching member towards the bottom of the receiving slot to allow the locking portion to slide on the one of the resisting slopes until the locking portion arrives at the peak portion; when the locking portion overlies the peak portion, the elastic piece is released to rebound the latching member, to allow the locking portion to slide on the other resisting slope until the locking portion is locked by the locking block.

14. The battery cover latching mechanism of claim 13, wherein the locking assembly further comprises a fixing board fixed to the housing and covering the corresponding receiving slot; the fixing board defines an assembly hole; the locking block exposed from the assembly hole.

15. The battery cover latching mechanism of claim 14, wherein the assembly portion further comprises two latching hooks protruding from the bottom of the receiving slot opposite to each other and positioned adjacent to two ends of the receiving slot, the latching member comprising two latching blocks formed at opposite ends of the base board, the latching blocks latching with the corresponding two latching hooks.

16. The battery cover latching mechanism of claim 15, wherein the assembly portion further comprises a post protruding from the bottom of the receiving slot and located between the two latching hooks, the elastic piece comprises a coil spring coiled around the post.

17. The battery cover latching mechanism of claim 15, wherein each latching hook is received within the receiving slot and comprises a guide arm perpendicularly projecting from the bottom of the receiving slot and a hook portion formed at the distal end of the guide arm.

* * * * *